United States Patent [19]

Lattuada

[11] Patent Number: 4,657,224
[45] Date of Patent: Apr. 14, 1987

[54] PNEUMATICALLY ACTUATED VALVE

[75] Inventor: Sergio Lattuada, Bergamo, Italy

[73] Assignee: STI Strumentazione Industriale S.p.A., Bergamo, Italy

[21] Appl. No.: 687,589

[22] Filed: Dec. 31, 1984

[30] Foreign Application Priority Data

Jul. 19, 1984 [IT] Italy .................................. 2917 A/84

[51] Int. Cl.⁴ .......................................... F16K 31/163
[52] U.S. Cl. ............................... 251/63.5; 137/505.28
[58] Field of Search ................... 251/120, 121, 62, 63, 251/63.5; 137/509, 510, 505.28

[56] References Cited

U.S. PATENT DOCUMENTS

| | | | |
|---|---|---|---|
| 635,149 | 10/1899 | Schreidt | 137/509 |
| 2,721,576 | 10/1955 | Grove et al. | 137/505.28 |
| 2,759,699 | 8/1956 | Rush | 251/63.5 |
| 2,783,020 | 2/1957 | Kleczek | 251/63.5 |

Primary Examiner—Samuel Scott
Assistant Examiner—Noah Kamen

[57] ABSTRACT

The pneumatically actuated valve is of the type, which is normally closed, has a constant autocontrolled rate of flow and is particularly but not exclusively used in adsorption working installations for drying gases. The valve is capable of effecting a decompression at a constant rate of flow up to atmospheric pressure, and a successive venting of regenerating gases at atmospheric pressure. The valve comprises a valve member with a first orifice controlling a variable upwardly located section area of a second orifice having a fixed section area said orifices being separated by an annular chamber which is connected with one of the two section of a variable volume chamber through an axial passage of a spring-urged piston sub-diving the last-mentioned chamber in the two sections, the other section of the variable volume chamber being connected with a constant pressure pilot circuit.

1 Claim, 5 Drawing Figures

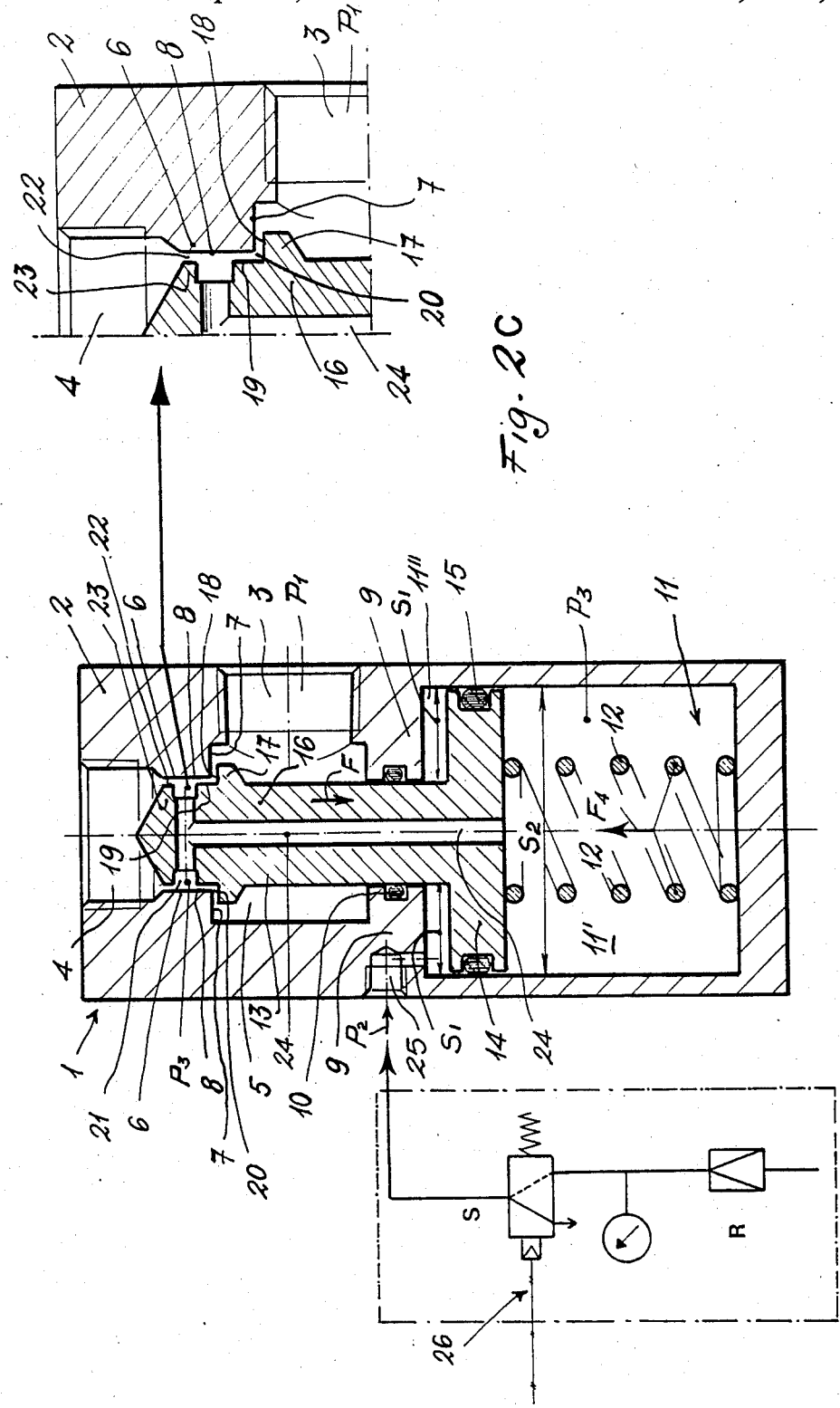

PNEUMATICALLY ACTUATED VALVE

BACKGROUND OF THE INVENTION

The present invention relates to a pneumatically controlled valve of the type which is normally closed, has a constant autocontrolled rate of flow and is particularly but not exclusively used for drying gases by absorption to effect decompression of the installation tanks or reservoirs at a constant rate of flow up to atmospheric pressure, and the successive free venting of the regenerating gas at atmospheric pressure.

Gas drying installations of the adsorption type (see FIG. 1) comprise in general two reservoirs A and B in which there are beds formed by layers of activated alumina and/or silica-gel.

The gas to be dried enters a reservoir A through a three-way valve C properly set and comes out dried through a similar valve D.

A fraction of said dried gas (said fraction being a function of the dimensions of a diaphragm E) flows through a reservoir B regenerating the bed of adsorbing material contained therein and comes out from the installation through a valve arrangement shown at F.

After the regeneration of the bed of reservoir B the bed of reservoir A being exhausted in the meantime, it is necessary to invert operation of the two reservoirs through the valves C and D.

However before effecting the inversion it is necessary to pressurize reservoir B by closing its valve F.

After the inversion reservoir A is brought back to atmospheric pressure by opening its valve F which should theoretically effect a slow decompression under constant rate of flow and pressure gradient.

In general normally closed valves are used at F. Said known valves do not permit a gradual opening securing a slow and regular decompression of the reservoir previously operating in the drier mode so causing frequently lifting and upsetting of the adsorbing bed.

Further during the successive regeneration step, which occurs at atmospheric pressure the same valves must secure an unobstructed discharge of the gas employed for the regeneration. To achieve this a passage sectional area is needed which is from 5 to 10 times greater than the optimal one used in the decompression step.

In general the mentioned problems are only partially solved by using two valves instead of the only valve of the invention; one of said two valves is a decompression valve having a passage sectional area adequately small and the second one of greater size working sequentially to, and mounted separately from the first mentioned valve. The second valve permits the unobstructed discharge at atmospheric pressure of the regenerating gas, however this involves higher costs and a more complex operation of the programmer device controlling the valves.

It has been further ascertained that the decompression step, although being conducted with a valve having an adequately small passage sectional area does not have—in opposition to what is desired—a linear characteristic of the function time us pressure variation but only an exponential one.

Instead of two valves it has been suggested to use a single valve of proper size, the valve member of which is controlled by a big pneumatic servo-motor, in general of the membrane type, operated by the pressure differential produced by a diaphram or Venturi tube in the exhaust conduit downstream the valve. Said known valve obtains a decompression with a linear gradient, but, by employing a downstream located meeasurement orifice or Venturi tube, it causes a resistance, i.e., a backpressure on the regenerating gas, and thus an efficiency reduction of the regeneration.

SUMMARY OF THE INVENTION

It is an object of the present invention to provide a single valve capable of producing by virtue of its particular valve member a variable loss of pressure and a constant rate of flow during decompression assuring a linear pressure variation during decompression, i.e., with a constant discharge rate of flow, without lifting the adsorbent bed, and also capable of permitting subsequently, during regeneration, the free exhaust of the gases at ambient pressure without obstructions, there being no venturimetric throttlings on the discharge port.

BRIEF DESCRIPTION OF THE DRAWING

These and further objects of the invention will be apparent to those skilled in the art on perusing the following the description and claims; the invention is illustrated, by way of exemplification only, in the figures of the enclosed sheets of drawings, wherein:

FIG. 2A is a sectional view of a valve according to the invention in the position corresponding to the decompression of the associated reservoir;

FIG. 2B is a schematic diagram of the piloting circuit for the pilot pressure inlet of FIG. 2A;

FIG. 2C is an expanded view of a portion of FIG. 2A as indicated by the arrow;

DESCRIPTION OF THE PREFERRED EMBODIMENT

Figure 3:
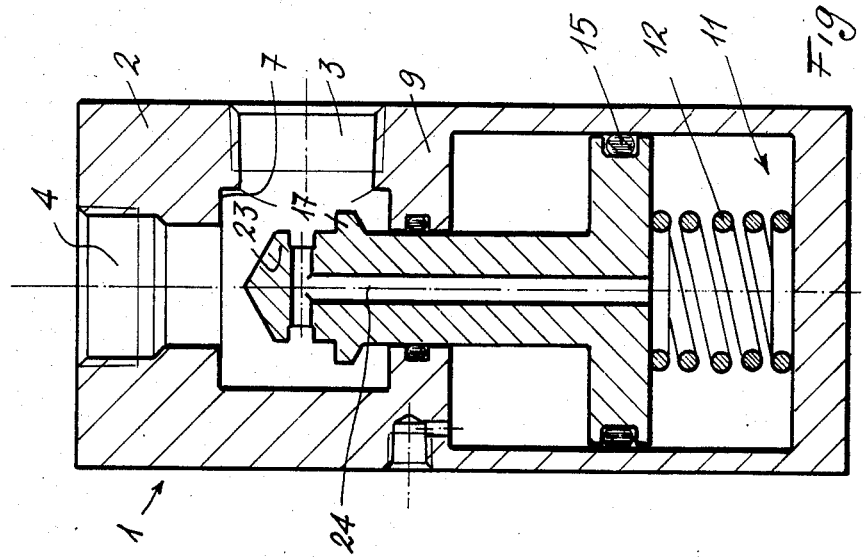
FIG. 3 is a sectional view corresponding to FIG. 2 but in the position corresponding to the regeneration of the associated reservoir.
Figure 1:
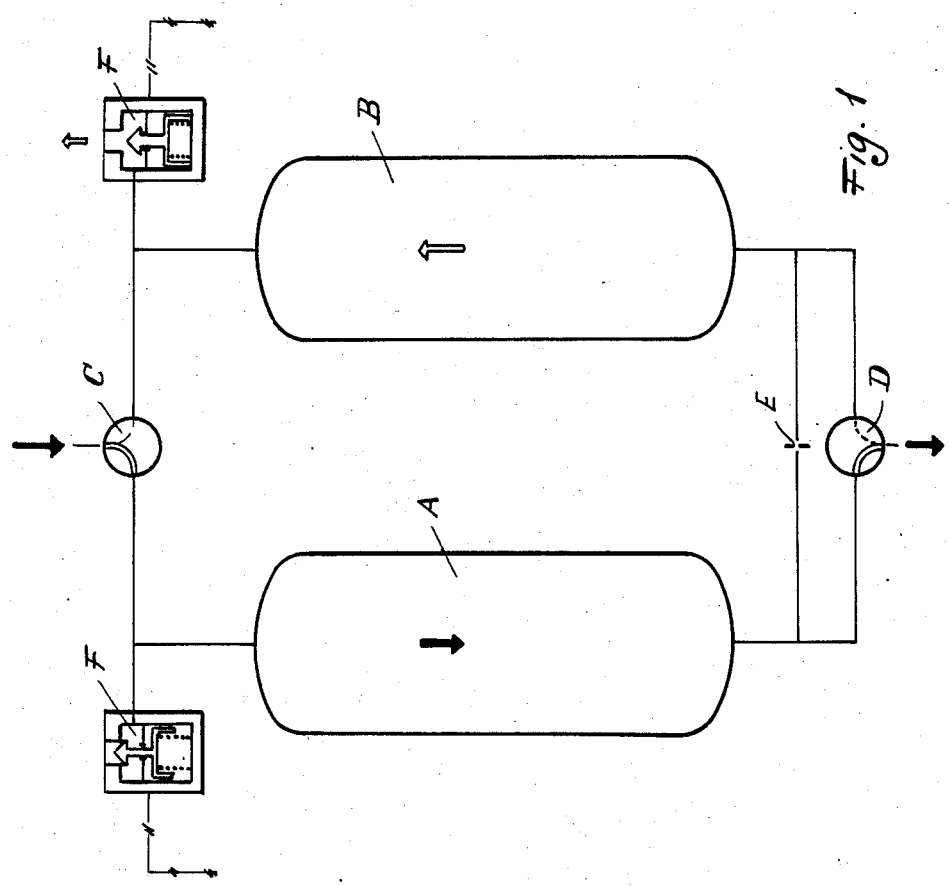
FIG. 1 shows diagrammatically an installation operating by adsorption for drying gases.

With particular reference to FIG. 2, the valve of the invention, shown at 1, comprises a body 2 having an inlet conduit 3 and an outlet conduit 4 located at right angles and confluent in a chamber 5 provided with an annular collar 6 having consecutive mutually perpendicular face portions 7 and 8 forming a valve seat.

The valve body 2 further provides a second collar 9 spaced from the first one and housing a ring gasket 10 separating two chambers 5 and 11''. Via an inlet post 25 chamber 11'' is connected with a piloting circuit 26, controlled by a programmer device.

The valve 2 has a valve member 13 having a T-shaped longitudinal section and connected with a piston 14 displaceable within a chamber 11. The piston 14 subdivides chamber 11 in two portions indicated at 11' and 11''', respectively; the seal between the two chamber portions 11' and 11''' is assured by a ring seal 15.

The upper section 16 of the valve member 13 is provided with an annular projection 17 having two surfaces 18, 19 opposite two face portions 7, 8 and forming with same a first annular orifice 20, whose section varies according to the position of the valve member 13. The annular orifice 20 communicates with a ring chamber 21 which connects to an outlet conduit (at 4) through a second annular orifice 22 which is defined by face portion 8 and a circular corner 23 of the valve member.

It is important to note that for a portion of the displacement of the valve member 13 the dimensions of said second orifice 22 remain constant while the dimensions of the orifice 20 vary.

The annular chamber 21 is connected with chamber portion 11' through a T-shaped conduit 24.

When the valve is closed surface 18 of the annular projection 17 abuts against the corresponding surface 7 of collar 6.

Now the operation of the pneumatically controlled valve will be described starting from the situation in which the valve controls the decompression of the associated reservoir. $S_1$ is the piston surface on which the force generated by the pressure P2 acts and $S_2$ is the opposite piston surface on which urges the spring F4 and the pressure P3 generating from the ring chamber 21.

To open the valve the force acting to open the valve must be greater than the force to close the valve, or $$P0 \cdot S(23) + P2 \cdot S_1 > F4 + P3 \cdot S_2$$

It is assumed that when the valve member 13 is in the closed position, P3=Po=Atmospheric pressure, the thrust $P3 \cdot S_2$ s 0, and to open the valves requires that $P2 \cdot S_1 > F4$ (F4 is the load of the spring). It is further assumed that the pressure P0 at outlet 4, acting at the surface across the end of the valve member at 23, S(23), and at chamber 5 when the valve is fully opened, is for practical purposes equal to atmospheric pressure.

However it is interesting to notice that as soon as the valve member 13 begins to open under the thrust of the pressure P2, immediately—due the particular profile of the valve member—a pressure P3>P0 is generated in the ring chamber 21, said pressure being a function of the degree of opening of the valve member. In fact it is evident that when the valve is fully opened pressure P3 can be even equal to pressure P1 of the reservoir during decompression.

Thus pressure P3 is modulated by the valve member opening position which influences the dimensions of the first annular orifice 20 and, by acting through the conduit 24 on the surface S2 of the piston, accomplishes a feed-back function which doesn't permit the complete opening of the valve member but automatically modulates the position of the valve member to equalize the force $P2 \cdot S_1$, thus achieving the following balance:

$$P0 \cdot S(23) + P2 \cdot S_1 = P3 \cdot S_2 + F4 = \text{CONSTANT}$$

It is interesting to notice that F4 being practically constant for small travels of the valve member and $S_2$ being constant, feed-back pressure P3 also automatically assumes a constant value.

Now considering that under conditions of moderate opening of the valve member the discharge sectional area $S_3$ (which corresponds to the area of the second annular orifice 22) is constant being annular, and remembering that also P3 is constant, it results that under said conditions the discharge rate of flow of the valve member is constant and independent from pressure P1 which decreases continuously during the decompression step.

The valve according to the invention thus achieves a fully linear decompression gradient, and only at the end of the decompression, when the feedback thrust $P3 \cdot S_2$ is insufficient to oppose the force $P2 \cdot S_1$, does the valve member reach the condition of fully opening as depicted in FIG. 3. At this stage, the orifice 32 is no longer constant, and the feedback pressure P3 is derived from the inlet pressure P1 and the outlet pressure P0, which become essentially equalized, the valve no longer operating to control the rate of flow.

It is further interesting to note that during the end portion of the decompression the particular shape of the valve member permits the same pressure existing in the reservoir to be obtained in the ring chamber 21, i.e., P3=P1.

Thus the control of the decompression is effective up to very low valves values of P1 and no lifting of the adsorbent material is obtained.

It is also interesting to note that when decompression is terminated, the valve assumes the fully opened position of FIG. 3 and assures the minimal back pressure to the discharge of the regenerating air.

On the contrary the discharge sectional area of the valve member is very small during decompression.

When the valve member is fully open, the passage sectional area is opened wide to permit a free discharge of the regenerating air; this is possible because there is no venturimetric type of throttling in the valve.

The calibration of the piloting pressure P2 permits obtaining a more or less higher compression gradient according to the requirements.

I claim:

1. A pneumatically controlled valve for use in decompression and subsequent venting of at least one tank used for adsorption drying of gases, said valve comprising a body (2) having an inlet conduit (3), an outlet conduit (4), and a first annular projection (6) having a surface (7) adjacent said inlet conduit, an inlet chamber (5) and a thrust chamber (11) within said body, a valve member (13) slideable within said inlet chamber (5) and connected with a piston (14) slideable within said thrust chamber (11), said thrust chamber (11) being sealingly separated from said inlet chamber (5) by guide means (9) for said valve member (13), said valve member (13) having a second annular projection (17) opposing said surface (7) of said first annular projection, said first and second annular projections thereby defining a first orifice (20), said valve member (13) having a third annular projection (23) at the end of said valve member opposite said piston (14), said third annular projection (23) and said first annular projection (6) defining a second orifice (22) having fixed dimensions substantially narrower than said outlet conduit (4) when said third annular projection (23) is adjacent said first annular projection (6), said orifices communicating with a feedback chamber (21) intermediate said orifices, said feedback chamber (21) communicating with a first portion (11') of said thrust chamber (11) through conduit means (24), said first portion (11') containing spring means (12) biasing said first orifice (20) to a closed position, said thrust chamber (11) having a second portion (11'') connected with a piloting circuit (26) at constant pressure biasing said first orifice (20) to an open position, and pressure from said feedback chamber (21) in said thrust chamber first portion (11') biasing said first orifice (20) to a closed position, whereby a constant rate of flow through said valve is maintained when said third annular projection (23) is adjacent said first annular projection (6).

* * * * *